Patented Oct. 19, 1948

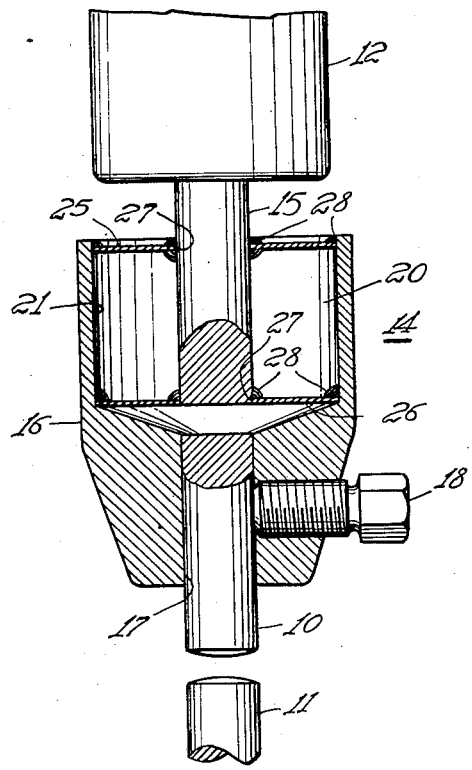

2,452,010

UNITED STATES PATENT OFFICE 2,452,010

WELDING APPARATUS

Foster R. Woodward, Pleasant Ridge, Mich., assignor to Westinghouse Electric Corporation, East Pittsburgh, Pa., a corporation of Pennsylvania Application May 21, 1946, Serial No. 671,215

6 Claims. (Cl. 219—4)

My invention relates generally to welding apparatus, and it has reference in particular to resistance welding apparatus.

Generally stated, it is an object of my invention to provide a resistance welding electrode mounting that is simple and inexpensive to manufacture and is reliable and efficient in operation.

More specifically, it is an object of my invention to provide for resiliently mounting resistance spot welding electrodes so as to permit a limited "follow up" of the electrode during a welding operation.

Another object of my invention is to provide for using flexible spaced flange members for resiliently supporting a spot welding electrode.

Yet another object of my invention is to provide for supporting a resistance spot welding electrode with predetermined resilient axial movement without permitting any transverse movement.

It is also an important object of my invention to provide for resiliently supporting a resistance spot welding electrode without any non-resilient or lost motion.

Still another object of my invention is to provide a relatively light weight resilient support for a spot welding electrode which permits only a limited axial movement of the electrode.

An important object of my invention is to provide for using substantially parallel concentric discs of spring material for flexibly coupling an electrode holder to a support for relative movement in an axial direction.

Other objects will in part be obvious, and will in part be explained hereinafter.

In practicing my invention in one of its forms, an axial support stem may be secured to an electrode holder having a socket for receiving an electrode, by means of substantially parallel axially spaced discs of a resilient conductive metal positioned on the stem and within an axial recess in the holder. The discs are brazed to the stem and the peripheries thereof are brazed to the walls of the recess in the holder.

For a more complete understanding of the nature and scope of my invention, reference may be made to the following detailed description which may be studied in connection with the accompanying drawing in which the single figure is a partially sectioned side elevational view of an electrode holder embodying the invention in one of its forms.

Referring to the drawing, the reference numerals 10 and 11 may denote resistance spot welding electrodes which may be arranged to engage work positioned therebetween for performing a welding operation thereon. Instead of positioning the electrode 10 directly in the usual electrode support 12 of a welding machine, means such as the resilient electrode holder 14 may be interposed between the electrode 10 and the support 12 for providing a predetermined resilient "follow up" to the electrode 10 for maintaining the necessary electrode pressure during plastic deformation of the work.

The electrode holder 14 may comprise, for example, a stem 15 and a body member 16. The body member may be made of hard drawn copper bronze, or other relatively hard and relatively conductive metal, and may be provided with a socket 17 in the lower end for receiving the electrode 10. A set-screw 18 may be used for securing the electrode in the socket.

A recess 20 may be provided in the upper end of the body 16 having a peripheral wall 21. The axial stem 15 may be positioned with one end in the recess 20 and the other end secured in the electrode support 12 of the machine in any suitable manner. The stem 15 may be connected to the body 16 by means of a plurality of resilient supports comprising, for example, a pair of discs 25 and 26 of a suitable conductive spring material such as, for example, beryllium copper, Phosphor, bronze, or other suitable spring alloys of relatively high conductivity. The discs 25 and 26 may be provided with central openings 27 for receiving the stem 23, and they may be secured to the stem and to the body 16 by means of welds or brazing 28.

During welding, the discs 25 and 26 are initially deformed upon the application of welding pressure between the electrodes 10 and 11. During the welding operation, the work being welded becomes partially plastic momentarily. Under this condition a certain amount of movement of the electrode 10, relative to the electrode 11, takes place under the spring pressure exerted by the deformed discs 25 and 26, thus maintaining the proper electrode pressure as the welded material yields. For relatively low electrode pressures on the order of 25 pounds to 100 pounds, deflections of .01 inch are satisfactory and may be secured by using discs of beryllium copper having an overall diameter of ¾ inch with a stem having a diameter of ¼ inch. A thickness on the order of .010 inch to .030 will suffice.

Since the force required for this movement of the electrode is proportional to the mass of the moving electrode and any rigidly attached members, the required force is greatly reduced by resiliently supporting the electrode 10 by means of an electrode holder 14, since all of the movable portions of the welding machine including the support 12 bearing the holder, are no longer rigidly connected to the electrode. While only two discs are shown, more may be used if it is desired to secure higher values of electrode pressure. This arrangement results in greatly improved quality of the welder with decreased marking or burning of the material, as well as decreased splashing or expulsion of the molten material from the weld. The porosity of the weld is greatly decreased and the strength thereof increased, and the amount of maintenance required to maintain the electrodes is greatly reduced.

Since certain changes may be made in the above described construction and different embodiments of the invention may be made without departing from the spirit or scope thereof, it is intended that all the matter contained in the above description and shown in the accompanying drawing shall be considered as illustrative, and not in a limiting sense.

I claim as my invention:

1. A holder for a spot welding electrode comprising, a stem, a socket for the electrode having a recess arranged to receive the stem, and means connecting the stem and socket including relatively flat resilient current conducting means positioned in the recess integrally connected to the stem and to the socket on opposite sides of the stem.

2. An electrode holder comprising, a stem, a pair of transversely projecting resilient current conducting members connected to the stem at longitudinally spaced intervals and projecting therefrom on opposite sides, and a socket for an electrode integrally connected to projecting edge portions of said current conducting members.

3. In an electrode holder, a longitudinal stem, a pair of metal discs secured to the stem in substantially parallel spaced longitudinal relation, and a socket for an electrode having a recess for receiving the discs, said discs being secured to the wall of the recess.

4. An electrode holder comprising, an elongated metal rod, a pair of discs of a resilient copper base alloy secured to the stem in spaced longitudinal relation, and a body member having a recess at one end for receiving an electrode and means at the other end connected to the discs at spaced points about the peripheries thereof.

5. For use in supporting a spot welding electrode, a body having an axial recess at one end for receiving the electrode and axially projecting means at the opposite end defining an axial opening, an elongated stem having one end centrally located in the axial opening, and a pair of relatively thin transverse spring members connected to the stem in longitudinally spaced relation and connected to the axially projecting means of the body.

6. For use in supporting a spot welding electrode, an elongated stem, a pair of metal discs of spring material positioned concentrically with the longitudinal axis of the stem and secured to the stem in longitudinally spaced relation, and a socket member having means for securing an electrode at one end and a longitudinally projecting peripheral wall at the other end connected to the peripheries of the discs.

FOSTER R. WOODWARD.

REFERENCES CITED

The following references are of record in the file of this patent:

UNITED STATES PATENTS

| Number | Name | Date |
| --- | --- | --- |
| 1,744,804 | Sanborn | Jan. 28, 1930 |
| 2,343,686 | Martindell | Mar. 7, 1944 |
| 2,365,148 | Clark | Dec. 12, 1944 |

FOREIGN PATENTS

| Number | Country | Date |
| --- | --- | --- |
| 691,990 | Germany | June 10, 1940 |